US012193362B2

(12) United States Patent
Gassner et al.

(10) Patent No.: US 12,193,362 B2
(45) Date of Patent: Jan. 14, 2025

(54) GARDEN TOOL

(71) Applicant: Andreas Stihl AG & Co. KG, Waiblingen (DE)

(72) Inventors: Markus Gassner, Koessen (AT); Laura Pantel, Raubling (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 759 days.

(21) Appl. No.: 17/356,009

(22) Filed: Jun. 23, 2021

(65) Prior Publication Data

US 2021/0400869 A1  Dec. 30, 2021

(30) Foreign Application Priority Data

Jun. 24, 2020  (EP) .................................. 20181948

(51) Int. Cl.
*A01D 34/68*  (2006.01)
*A01D 101/00*  (2006.01)

(52) U.S. Cl.
CPC ...... *A01D 34/68* (2013.01); *A01D 2034/6843* (2013.01); *A01D 2101/00* (2013.01)

(58) Field of Classification Search
CPC ................... A01D 34/68; A01D 34/69; A01D 2034/6843; B62D 51/04; B62B 5/0069; B62B 5/0033
USPC .......................................... 180/19.1; 56/10.8
See application file for complete search history.

(56) References Cited

U.S. PATENT DOCUMENTS

| 9,545,054 | B2 | 1/2017 | Prinzo |
| 2005/0247508 | A1 | 11/2005 | Gilliland et al. |
| 2010/0025124 | A1 | 2/2010 | Arpino |
| 2020/0107497 | A1* | 4/2020 | Ferrell ............... A01D 34/6806 |

FOREIGN PATENT DOCUMENTS

| DE | 43 24 092 C1 | 9/1994 | |
| EP | 2875709 B1 * | 5/2018 | ......... A01D 34/6806 |

OTHER PUBLICATIONS

EP-2875709-B1 translation (Year: 2018).*
German-language Extended European Search Report issued in European Application No. 20181948.9 dated Nov. 25, 2020 (seven (7) pages).

* cited by examiner

*Primary Examiner* — Christopher B Wehrly
(74) *Attorney, Agent, or Firm* — Crowell & Moring LLP

(57) ABSTRACT

A garden tool has a controllable travel drive system, wherein the travel drive system is designed to propel the garden tool, and a speed control device, wherein the speed control device has a user-operable operating element and a displacement sensor device. At least one sensor part of the displacement sensor device is supported so as to be movable in translation. The operating element is designed by its operation to displace at least the sensor part in translation. A sensor signal of the displacement sensor device is dependent on a translational position of at least the sensor part. The speed control device is designed for controlling the travel drive system for the variable setting of a travel speed of the garden tool in accordance with the sensor signal.

16 Claims, 12 Drawing Sheets

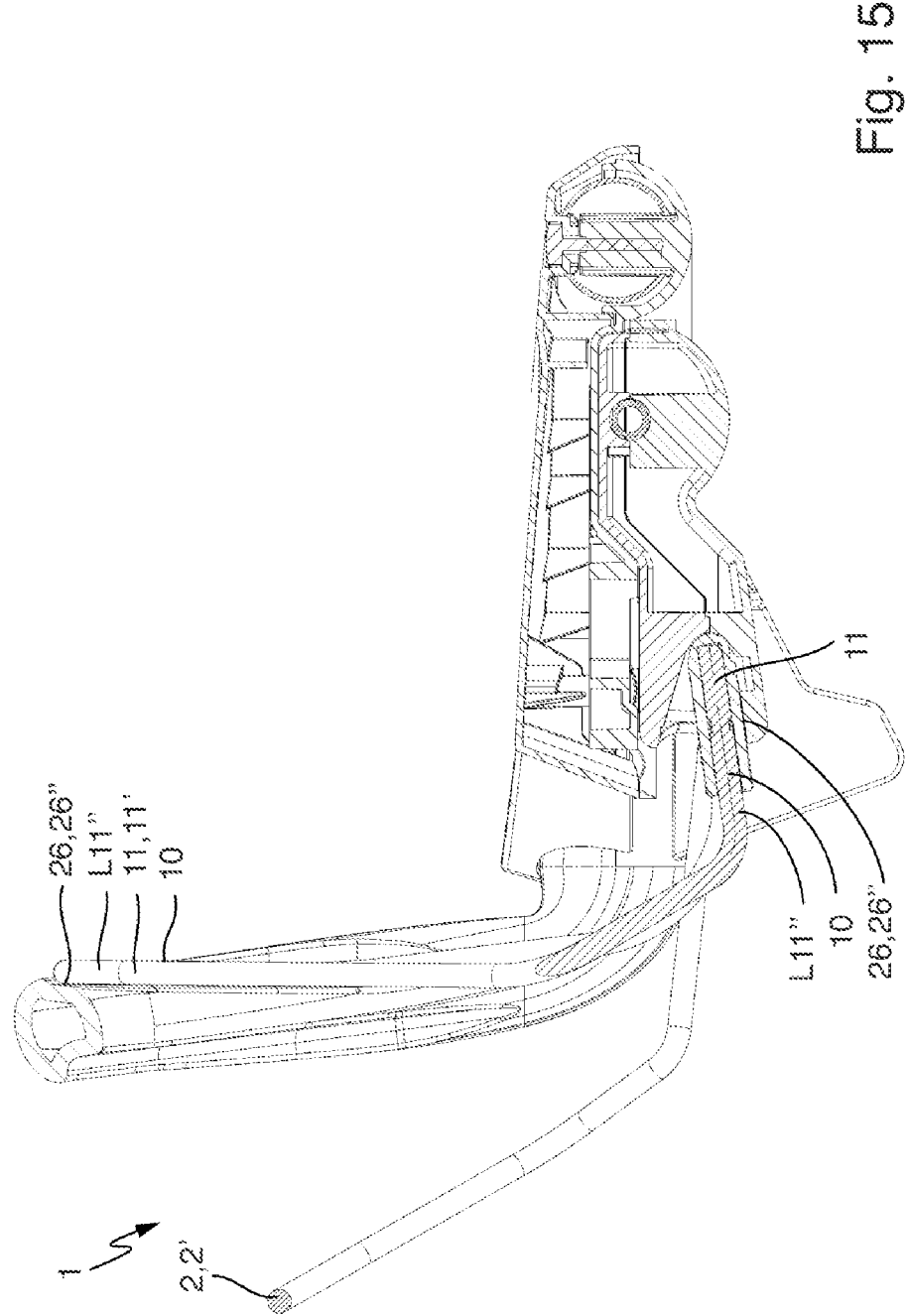

GARDEN TOOL

CROSS REFERENCE TO RELATED APPLICATION

This application claims priority under 35 U.S.C. § 119 from European Patent Application No. 20181948.9, filed Jun. 24, 2020, the entire disclosure of which is herein expressly incorporated by reference.

BACKGROUND AND SUMMARY OF THE INVENTION

The invention relates to a garden tool.

The problem addressed by the invention is that of providing a garden tool which has improved characteristics.

The invention solves this problem by providing a garden tool having the features of the independent claim. Advantageous developments and/or refinements of the invention are described in the dependent claims.

The, in particular electric, garden tool according to the invention comprises or has a, in particular electrically, controllable, in particular electric, travel drive system and a, in particular electric, speed control device, in particular a closed-loop speed control device. The travel drive system is designed or configured for propelling the garden tool, in particular automatically. The speed control device comprises or has a, in particular variable, user-operable or respectively user-actuable, in particular user-movable, operating element and a, in particular electric, displacement sensor device. At least one sensor part of the displacement sensor device, in particular the complete displacement sensor device, is supported in such a way as to be, in particular variably and/or linearly, translationally movable or shiftable. By its operation or respectively actuation, in particular its movement, the operating element is designed or configured for translational displacement or movement or shifting of at least the sensor part, in particular of the complete displacement sensor device. A sensor signal, in particular an electric and/or variably settable sensor signal, in particular a value of the sensor signal, of the displacement sensor device is dependent, in particular linearly dependent, on a translational position, in particular a variably settable translational position, in particular a value of the position or displacement of at least the sensor part. The speed control device is designed or configured for the, in particular automatic and/or electric, control, in particular closed-loop control, of the travel drive system for variably setting a travel speed, in particular a value of the travel speed, of the garden tool in accordance with the sensor signal.

This, in particular the travel drive system, makes it possible for a user of the garden tool not to have to push it. Furthermore, this, in particular the variable setting of the travel speed, enables the travel speed to have not just a single value. Thus, this makes possible a high level of comfort for the user. Moreover, this, in particular the translational movement or displacement of at least the sensor part, allows easy and/or reliable and/or inexpensive construction of the speed control device.

In particular, the garden tool can be a garden cultivating tool, in particular a lawnmower. In addition or as an alternative, the garden tool can be hand-held and/or guided along the ground. In particular, hand-held garden tool can mean that the garden tool can have a mass of at most 100 kilograms (kg), in particular of at most 50 kg, in particular of at most 20 kg, and/or of at least 5 kg, in particular of at least 10 kg.

The travel drive system can have wheels and/or a motor drive system, in particular for driving the wheels.

The speed control device may have a housing. In particular, at least the sensor part, in particular the complete displacement sensor device, can be supported so as to be movable in translation with respect to, in particular by, the housing. In addition or as an alternative, at least the sensor part, in particular the complete displacement sensor device, need not or may not be, in particular be supported so as to be, rotationally movable.

In order to displace at least the sensor part, the operating element can interact with it, in particular directly and/or indirectly, in particular can touch it.

By its operation, the operating element can be designed to displace at least the sensor part in order to variably set the position. In other words: the position can be variably set by the displacement.

The sensor signal can change with increasing position, in particular increasing and/or decreasing.

Variably can mean continuously or steadily. In addition or as an alternative, variably settable can mean settable to at least three different values and/or at least two values different from zero. As a further addition or alternative, "for variable setting" can mean for setting to at least three different values and/or at least two values different from zero.

In a development of the invention, the displacement sensor device comprises or has a switch, in particular an electric switch. A switching state, in particular an electric and/or settable switching state, in particular a value of the switching state, of the switch is dependent on the position. The speed control device, in particular the switch, is designed to enable, in particular automatically enable, in particular switch on, and/or disable, in particular switch off, the travel drive system in accordance with the switching state. This makes possible a high degree of safety of the speed control device, particularly in the case of incorrect control of the travel drive system, and thus of the garden tool. In particular, the switching state and the sensor signal can be independent of one another and/or different, in particular of different types.

In a development of the invention, the sensor part and a further sensor part of the displacement sensor device are supported so as to be movable or shiftable in translation relative to one another, in particular variably and/or linearly. The sensor signal is dependent on the position, in particular only, of the sensor part and of the further sensor part relative to one another. This allows the sensor signal to be variably settable. In particular, the operating element can be designed, by its operation, to displace the sensor part and the further sensor part relative to one another, in particular for variable setting of the position. In addition or as an alternative, the further sensor part can be supported by the sensor part so as to be movable or shiftable in translation, in particular variably and/or linearly. As a further addition or alternative, the sensor part and the further sensor part need not or may not be, in particular be supported so as to be, rotationally movable relative to one another. As a further addition or alternative, the sensor part can have a switch part of the switch, where present, and/or can interact, in particular directly, with it, in particular can touch it, and the further sensor part can have a further switch part of the switch and/or can interact, in particular directly, with it, in particular can touch it.

The displacement sensor device need not or may not have a rotary potentiometer.

In a refinement of the invention, the displacement sensor device comprises or has a linear potentiometer. The sensor signal is a potentiometer signal of the linear potentiometer. This allows the sensor signal to be dependent on the position of the sensor part and of the further sensor part relative to one another. In particular, the sensor part can have a potentiometer part of the linear potentiometer and/or can interact, in particular directly, with it, in particular can touch it, and the further sensor part can have a further potentiometer part of the linear potentiometer and/or can interact, in particular directly, with it, in particular can touch it. In addition or as an alternative, the potentiometer signal can have, in particular can be, a resistance signal, in particular an electric resistance signal, and/or a voltage, in particular an electric voltage, in particular a Hall voltage. As a further addition or alternative, the linear potentiometer can be different from the switch, where present.

In a refinement of the invention, the speed control device comprises or has a, in particular mechanical, limiting element. The limiting element is designed or configured for, in particular mechanically, limiting, in particular preventing, translational displacement or movement or shifting of the further sensor part when the operating element is operated, in particular for enabling, for translational displacement of the sensor part and of the further sensor part relative to one another. In particular, in order to limit the displacement of the further sensor part, the limiting element can interact, in particular directly, with the further sensor part, in particular can touch it. In addition or as an alternative, the limiting element can be designed to limit the displacement of the further sensor part with respect to the housing, where present.

In a refinement of the invention, the limiting element is supported so as to be movable, in particular variably. By its operation, in particular its movement, the operating element is designed or configured for translational displacement or movement or shifting of the further sensor part. The speed control device comprises or has a further user-operable or respectively user-actuable, in particular user-movable, operating element. The further operating element is designed or configured by its operation or respectively actuation, in particular its movement, to move the limiting element for variably settable limitation of the displacement of the further sensor part, in particular brings this about by the operation of the operating element. This allows variable setting of a maximum travel speed, in particular a value of the maximum travel speed, of the garden tool. Thus, this makes possible a particularly high level of comfort for the user. In particular, the limiting element can be movably supported with respect to, in particular by, the housing, where present. In addition or as an alternative, the further sensor part can be supported so as to be movable or shiftable in translation, in particular variably and/or linearly, with respect to the housing, where present. As a further addition or alternative, the further sensor part need not or may not be, in particular be supported so as to be, rotationally movable. As a further addition or alternative, the operating element can interact with the further sensor part, in particular by means of the sensor part, in order to displace said further sensor part. As a further addition or alternative, the further operating element can interact with the limiting element, in particular directly and/or indirectly, in order to move said limiting element.

In a refinement of the invention, the speed control device comprises or has a further, in particular mechanical, limiting element. The further limiting element is designed or configured to limit, in particular mechanically, the operation of the operating element and/or the displacement of the sensor part in order to limit the displacement of the sensor part and of the further sensor part relative to one another, in particular that caused by the operation of the operating element. In particular, the further limiting element need not or may not be, in particular be supported so as to be, movable with respect to the housing. In other words: the further limiting element can be immovable or fixed with respect to the housing. In particular, the further limiting element can be part of the housing, or the housing can have the limiting element. In addition or as an alternative, in order to limit the operation of the operating element and/or the displacement of the sensor part, the further limiting element can interact with these/this, in particular directly and/or indirectly, in particular can touch these/this. As a further addition or alternative, the further limiting element can be designed to limit the operation of the operating element and/or the displacement of the sensor part with respect to the housing, where present.

In a refinement of the invention, the limiting element comprises or has an eccentric link section for variably settable limitation of the displacement of the further sensor part and is supported so as to be rotationally movable or rotatable. This allows simple and/or reliable setting of the limitation. In particular, in order to limit the displacement of the further sensor part, the eccentric link section can interact, in particular directly, with the further sensor part, in particular can touch it. In addition or as an alternative, the further operating element can be designed, by its operation, for the rotational movement or rotary movement of the limiting element for variably settable limitation of the displacement of the further sensor part. As a further addition or alternative, the limiting element need not or may not be, in particular be supported so as to be, movable in translation. As a further addition or alternative, a displacement axis of the further sensor part and an axis of rotation of the limiting element can extend non-parallel to one another, in particular orthogonally and/or askew.

In a refinement of the invention, when the displacement of the further sensor part is limited, its displacement axis and a surface of the eccentric link section extend approximately, in particular precisely, orthogonally to one another. This makes it possible to reduce or even prevent torque being transmitted from the further sensor part to the limiting element. Thus, this makes it possible to prevent unintentional adjustment of the limiting element. In particular, the surface can interact, in particular directly, with, in particular touch, the further sensor part. In addition or as an alternative, a deviation can for instance signify, in particular, an angular deviation of a maximum of 15 degrees (°), in particular a maximum of 5°, in particular a maximum of 1°.

In a refinement of the invention, the speed control device comprises or has a latching mechanism. The latching mechanism is designed or configured for the, mechanical and/or stepwise, latching of the, in particular variable, setting of the limiting element. This makes it possible to prevent unintentional adjustment of the limiting element. In particular, the latching can be releasable, non-destructively and/or without tools. In addition or as an alternative, the latching mechanism can interact, in particular directly and/or indirectly, with the limiting element. In particular, the latching mechanism can partially be a part of the limiting element, or the limiting element can have a part of the latching mechanism. As a further addition or alternative, the latching mechanism can be designed to latch the setting of the limiting element with respect to the housing, where present.

In a refinement of the invention, the latching mechanism is resilient, in particular the latching mechanism comprises or has a body spring. This allows a simple and/or reliable construction of the latching mechanism.

In a refinement of the invention, the further operating element is supported so as to be rotationally movable or rotatable. This allows a simple and/or reliable construction of the speed control device. In particular, the further operating element can be designed, by its rotational movement or rotary movement, to move the limiting element for variably settable limitation of the displacement of the further sensor part. In addition or as an alternative, the further operating element can be supported with respect to, in particular by, the housing so as to be rotationally movable. As a further addition or alternative, the further operating element need not or may not be, in particular be supported so as to be, movable in translation.

In a development, in particular a refinement, of the invention, the speed control device, in particular the displacement sensor device, comprises or has a sensor return element. The sensor return element is designed or configured to apply force to at least the sensor part, in particular and the further sensor part away from one another, into a translational sensor starting position. This allows automatic deactivation of the travel drive system or setting of the travel speed to zero. Thus, this permits a high level of safety of the speed control device and thus of the garden tool. In particular, the sensor return element can have, in particular can be, a spring, in particular a helical spring. In addition or as an alternative, the sensor return element can interact with the sensor part, in particular and the further sensor part, in particular directly, in order to apply force to at least the sensor part, in particular and the further sensor part away from one another, into the sensor starting position, in particular can touch said sensor part(s). As a further addition or alternative, the operating element can interact with the further sensor part by means of the sensor return part in order to displace said further sensor part.

In a development of the invention, the operating element is supported so as to be movable. The speed control device comprises or has an operating return element. The operating return element is designed or configured to apply force to the operating element into an operating starting position. This allows for the possibility that the operating element need not or may not displace at least the sensor part. Thus, this allows automatic deactivation of the travel drive system or setting of the travel speed to zero. Thus, this permits a high level of safety of the speed control device and thus of the garden tool. In particular, the operating element can be movably supported with respect to, in particular by, the housing. In addition or as an alternative, the operating return element can have, in particular can be, a spring, in particular a helical spring. As a further addition or alternative, in order to apply force to the operating element into the operating starting position, the operating return element can interact with it, in particular directly, in particular can touch it. As a further addition or alternative, the operating return element can be different from the sensor return element, where present.

In a development of the invention, the operating element is supported so as to be rotationally movable or rotatable. This allows a simple and/or reliable construction of the speed control device. In particular, the operating element can be designed to displace at least the sensor part by its rotational movement or rotary movement. In addition or as an alternative, the operating element can be supported with respect to, in particular by, the housing so as to be rotationally movable. As a further addition or alternative, the operating element need not or may not be, in particular be supported so as to be, movable in translation. As a further addition or alternative, a displacement axis at least of the sensor part and an axis of rotation of the operating element can extend non-parallel to one another, in particular orthogonally and/or askew.

Further advantages and aspects of the invention will become apparent from the claims and from the following description of at least one preferred exemplary embodiment of the invention, which are explained below with reference to the drawings.

BRIEF DESCRIPTION OF THE DRAWINGS

FIG. 15 shows a further sectional view of the speed control device having the operating element maximally operated as in FIG. 5.

DETAILED DESCRIPTION OF THE DRAWINGS

Figure 1:
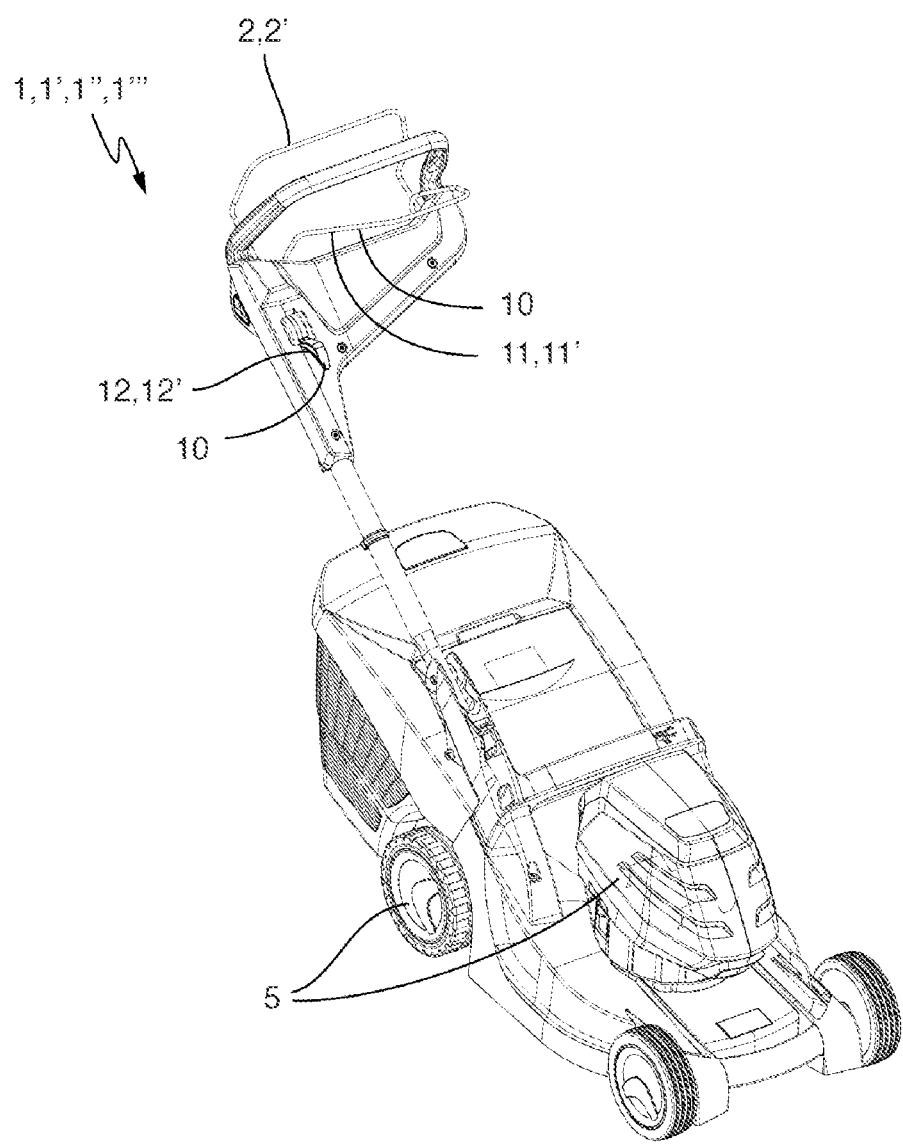
FIG. 1 shows a perspective view of a garden tool according to an embodiment of the invention having a controllable travel drive system and a speed control device.
Figure 2:
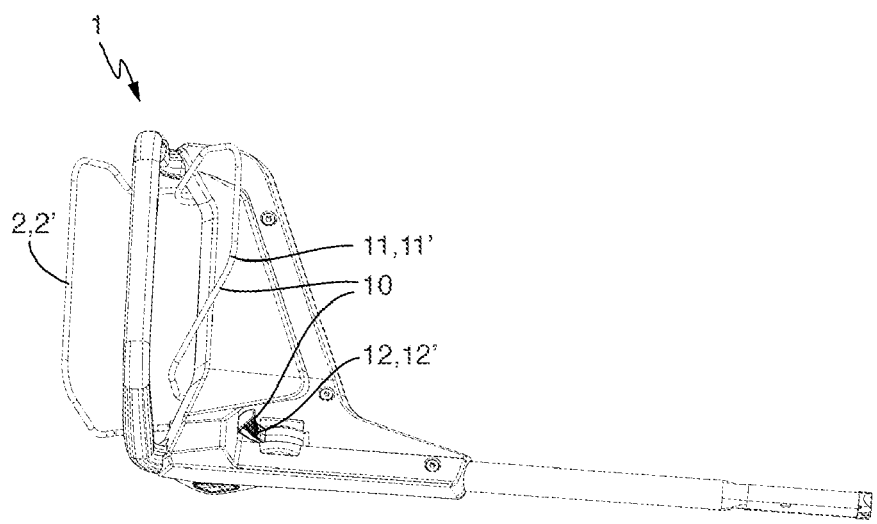
FIG. 2 shows a perspective view of the speed control device.
Figure 3:
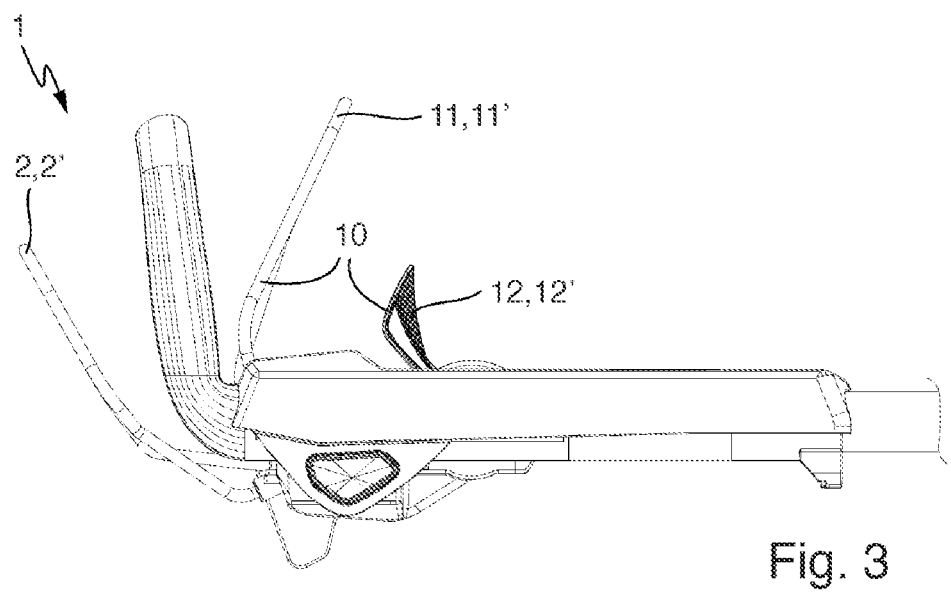
FIG. 3 shows a side view of the speed control device.
Figure 5:
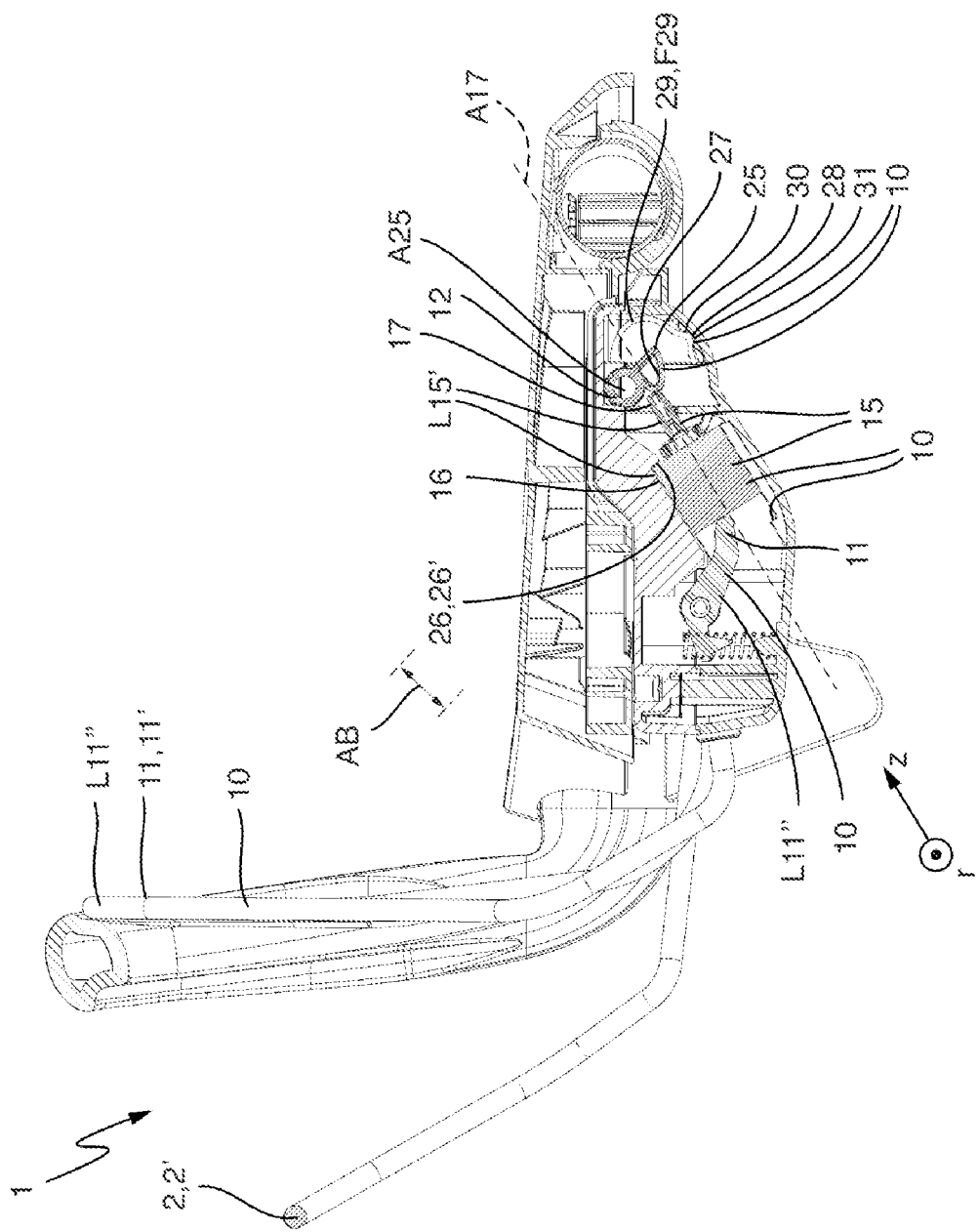
FIG. 5 shows a sectional view of the speed control device having the operating element, maximally operated, the limiting element, not moved, and a displacement sensor device, displaced to the maximum extent in translation by the maximally operated operating element, having a sensor part and a further sensor part, not displaced in translation relative to one another by the operated operating element and the unmoved limiting element.
Figure 6:
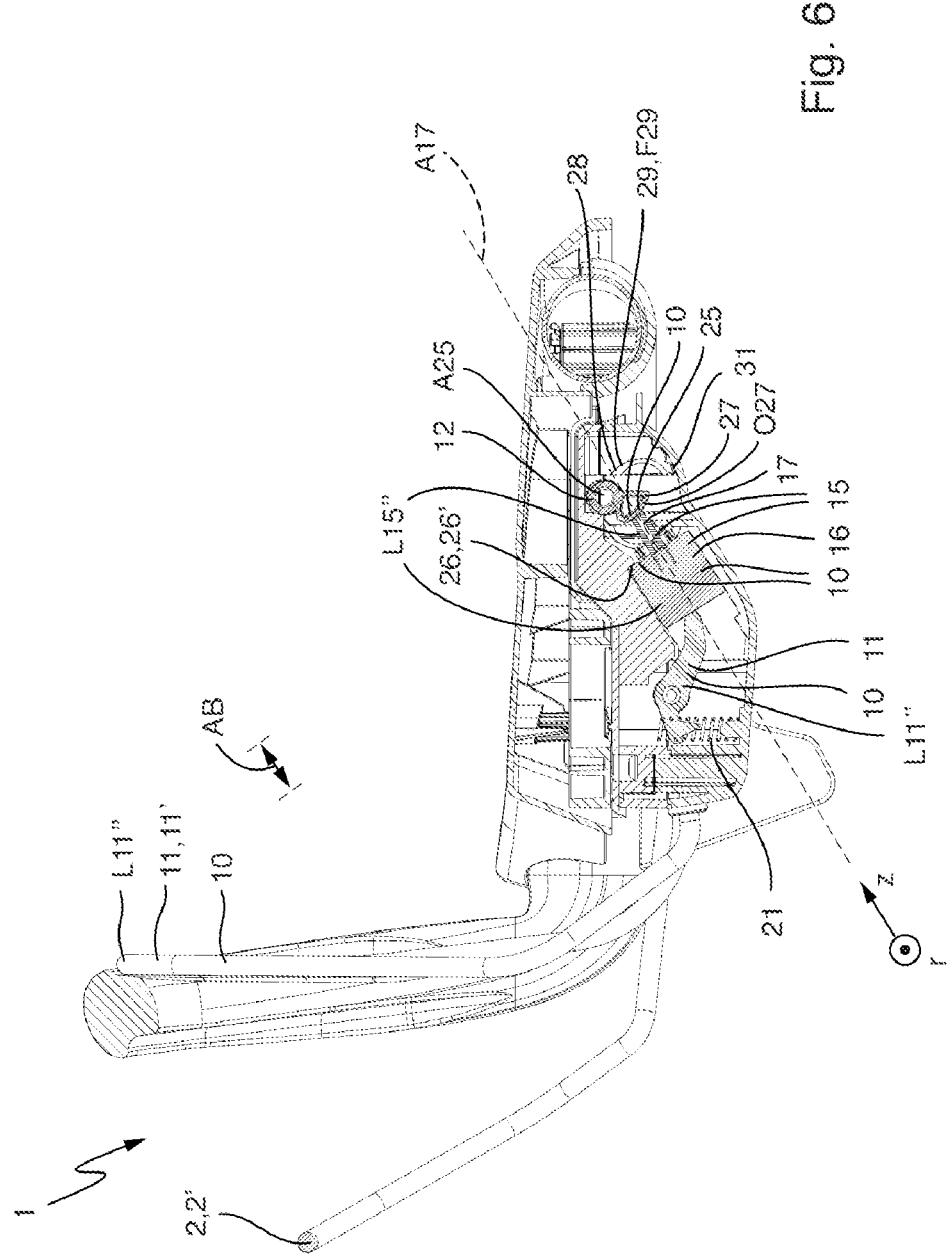
FIG. 6 shows a sectional view of the speed control device having the operating element, maximally operated, the limiting element, moved, and the sensor part and the further sensor part, displaced relative to one another by the operated operating element and the moved limiting element.
Figure 12:
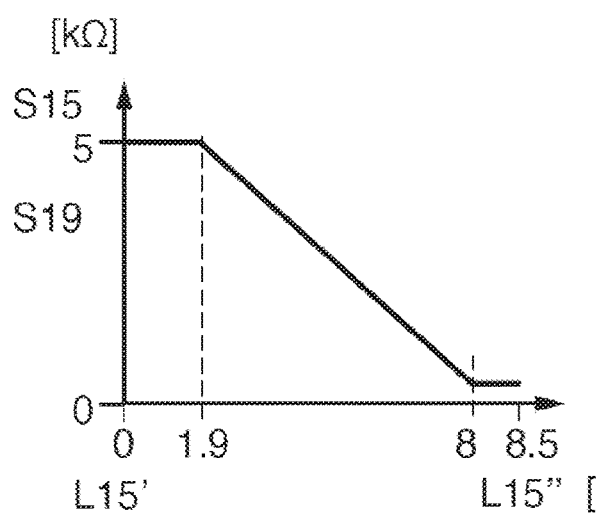
FIG. 12 shows a graph of a sensor signal in the form of a potentiometer signal of the linear potentiometer over a position of the sensor part and the further sensor part relative to one another.
Figure 14:
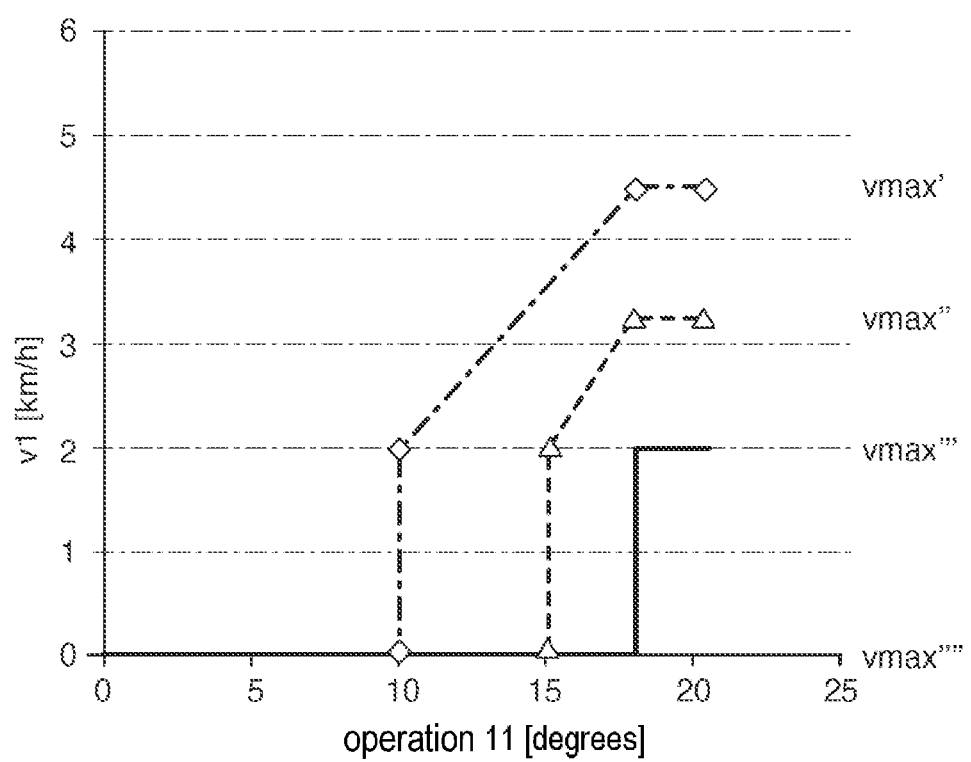
FIG. 14 shows a graph of a travel speed of the garden tool for various operations of the operating element and various movements of the limiting element.

FIG. 1 shows a garden tool 1. The garden tool 1 has a controllable travel drive system 5 and a speed control device 10, as shown in FIGS. 2 and 3. The travel drive system 5 is designed to propel, in particular propels, the garden tool 1. The speed control device 10 has a user-operable operating element 11 having, in the exemplary embodiment shown, a hoop 11', and a displacement sensor device 15, as shown in FIGS. 4 to 10. At least one sensor part 16 of the displacement sensor device, in the exemplary embodiment shown the complete displacement sensor device 15, is supported so as to be movable in translation, in particular is moved or displaced in translation, as shown in FIGS. 5, 6 and 8, in the exemplary embodiment shown in a direction z. The operating element 11 is designed, by its operation, for the, in particular direct, translational displacement of, in particular displaces, at least the sensor part 16, in the exemplary embodiment shown the complete displacement sensor device 15, as shown in FIGS. 5, 6 and 8, in the exemplary embodiment shown in the direction z. A sensor signal S15 of the displacement sensor device 15 is dependent on a translational position L15', L15" at least of the sensor part 16, in the exemplary embodiment shown in the direction z, as shown in FIG. 12. As shown in FIG. 14, the speed control device 10 is designed to control, in particular controls, the travel drive system 5 in order to variably set a travel speed v1 of the garden tool 1 in accordance with the sensor signal S15, in particular and thus variably sets the travel drive system 5.

In the exemplary embodiment shown, the garden tool 1 is a lawnmower 1'.

In detail, the garden tool 1 has a garden implement (not shown), in particular a garden cultivating implement, in the exemplary embodiment shown a lawn mowing implement, an operable implement drive system (not shown) for driving the garden implement and another operating element 2, in the exemplary embodiment shown having a different hoop 2', for operating the implement drive system.

Furthermore, in the exemplary embodiment shown, the travel drive system 5 has two wheels and a motor drive system (not shown) for driving the two wheels.

Otherwise, in the exemplary embodiment shown, the garden tool 1 has two further wheels, in particular non-driven wheels.

Moreover, in the exemplary embodiment shown, the garden tool 1 is an electric garden tool 1", in particular a battery-powered garden tool 1".

Furthermore, the operating element 11 is supported so as to be movable, in particular is moved or displaced, in particular rotationally, as shown in FIGS. 5, 6 and 8, in the exemplary embodiment shown around a direction r orthogonal to the direction z.

In addition, the sensor part 16 and a further sensor part 17 of the displacement sensor device 15 are supported so as to be movable in translation relative to one another, in particular are moved or displaced, as shown in FIGS. 6 and 8, in the exemplary embodiment shown in the direction z. The sensor signal S15 is dependent on the position L15', L15" of the sensor part 16 and of the further sensor part 17 relative to one another.

Figure 10:
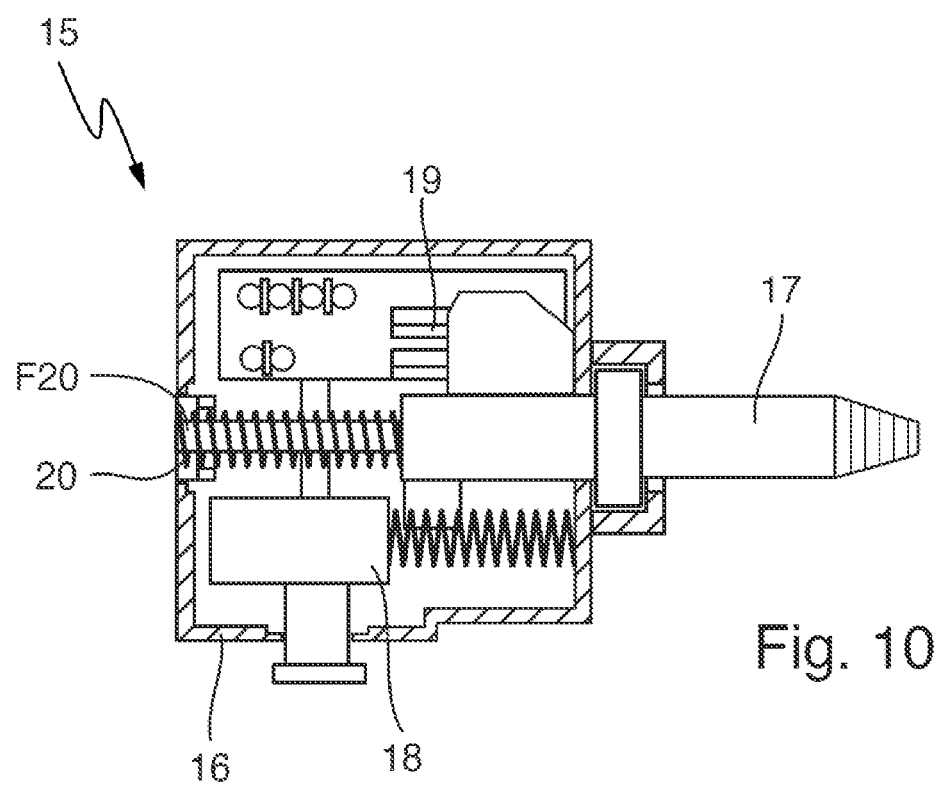
FIG. 10 shows a sectional view of the displacement sensor device having a switch, a linear potentiometer and a sensor return element.

Furthermore, the displacement sensor device 15 has a linear potentiometer 19, as shown in FIG. 10. The sensor signal S15 is a potentiometer signal S19 of the linear potentiometer 19, as shown in FIG. 12.

In particular, the sensor signal S15, in the exemplary embodiment shown in the form of the potentiometer signal S19, changes with increasing position L15", in particular decreases.

Figure 7:
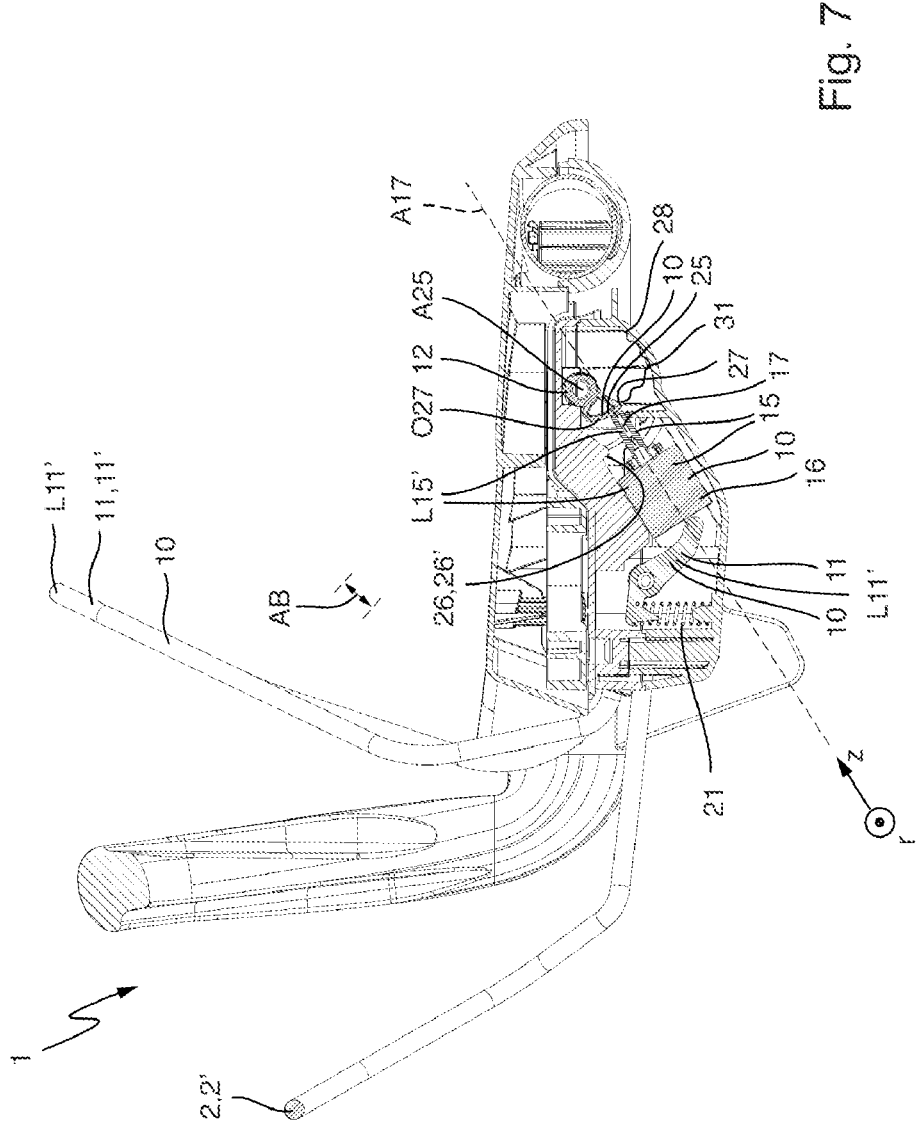
FIG. 7 shows a sectional view of the speed control device having the operating element, not operated, the limiting element, maximally moved, and the sensor part and the further sensor part, not displaced relative to one another by the non-operated operating element and the maximally moved limiting element.
Figure 8:
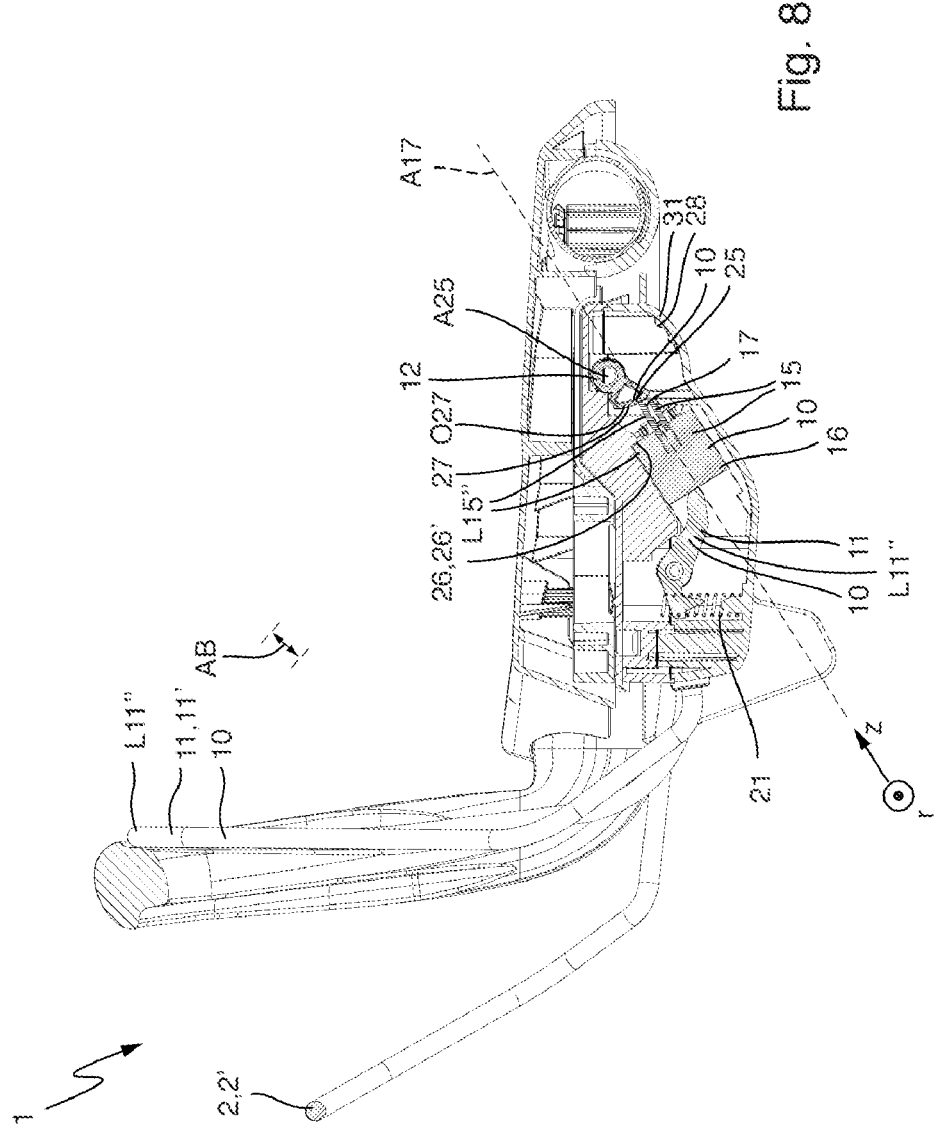
FIG. 8 shows a sectional view of the speed control device having the operating element, maximally operated, the limiting element, maximally moved, and the sensor part and the further sensor part, maximally displaced relative to one another by the maximally operated operating element and the maximally moved limiting element.
Figure 9:
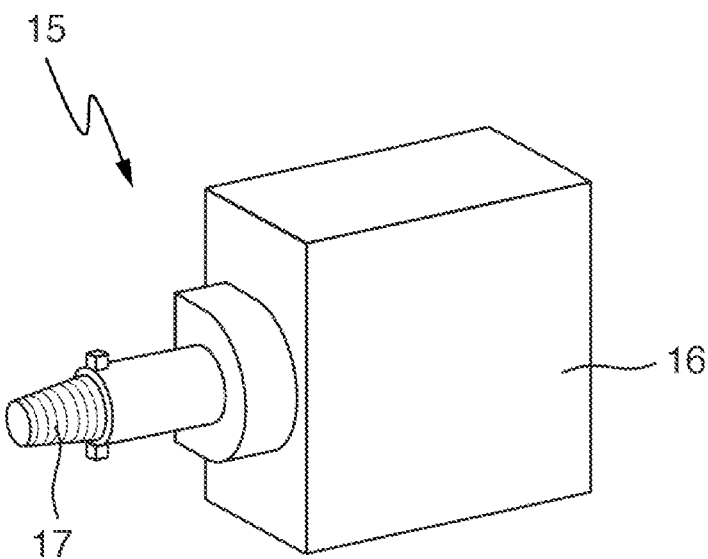
FIG. 9 shows a perspective view of the displacement sensor device.

Moreover, the speed control device 10 has a limiting element 25, as shown in FIGS. 4 to 8. The limiting element 25 is designed for directly limiting, in particular limits, a translational displacement of the further sensor part 17, in the exemplary embodiment shown in the direction z, upon operation of the operating element 11 for translational displacement of the sensor part 16 and of the further sensor part 17 relative to one another, as shown in FIGS. 6 to 8.

In detail, the limiting element 25 is supported so as to be movable, in particular is moved or displaced, in particular rotationally, as shown in FIGS. 6 to 8, in the exemplary embodiment shown around the direction r.

Additionally, in the exemplary embodiment shown, the operating element 11 is designed by its operation for translational displacement of, in particular displaces, the further sensor part 17 in the direction z, as shown in FIGS. 5, 6 and 8. The speed control device has a further user-operable operating element 12, in the exemplary embodiment shown having a lever 12', as shown in FIGS. 1 to 3. By its operation, the further operating element 12 is designed for the, in particular direct, movement of, in particular moves, the limiting element 25, in the exemplary embodiment shown around the direction r, for variably settable limitation of the displacement of the further sensor part 17, as shown in FIGS. 6 to 8, in the exemplary embodiment shown around the direction r.

Furthermore, the speed control device 10 has a further limiting element 26, in the exemplary embodiment shown in the form of a shoulder 26' and/or at least one stop 26", as shown in FIGS. 4 to 8 and 15. The further limiting element 26 is designed, in particular by means of the sensor part 16, to limit, in particular limits, the operation of the operating element 11 and/or to limit, in particular limits, in particular directly, the displacement of the sensor part 16 in order to limit the displacement of the sensor part 16 and of the further sensor part 17 relative to one another, as shown in FIGS. 5, 6, 8 and 15.

Moreover, the limiting element 25 has an eccentric link section 27 for variably settable limitation of the displacement of the further sensor part 17 and is supported so as to be rotationally movable, as shown in FIGS. 4 to 8.

In detail, when the displacement of the further sensor part 17 is being limited, the displacement axis A17 thereof and a surface O27 of the eccentric link section 27 extend approximately orthogonally to one another.

In particular, the displacement axis A17 of the further sensor part 17 and an axis of rotation A25 of the limiting element 25 extend non-parallel to one another, in the exemplary embodiment shown orthogonally and/or askew.

In other words: the further operating element 12 is designed, by its operation, for, in particular directly, variable setting of a translational distance AB of the limiting element 25, in particular of the surface O27 of the eccentric link section 27, and of the further limiting element 26, in the exemplary embodiment shown in the form of the shoulder 26', relative to one another, in the exemplary embodiment shown in the direction z, in particular sets it variably.

Furthermore, the speed control device has a latching mechanism 28, as shown in FIGS. 4 to 8. The latching mechanism 28 is designed for latching, in particular directly latching, in particular latches, the setting of the limiting element 25.

In detail, the latching mechanism 28 is resilient. In particular, the latching mechanism 28 has a body spring 29.

In particular, the body spring 29 is supported so as to be movable, in particular is moved or displaced, in particular rotationally, as shown in FIGS. 6 to 8, in the exemplary embodiment shown around the direction r. Furthermore, the body spring 29 is connected firmly, in particular in rotation, to the limiting element 25, in particular these are integrated.

In addition, the latching mechanism 28 has a plurality of, in particular non-movable or immovable or fixed, depressions 31, in particular in each case, for latching a projection 30 of the body spring 29.

In alternative exemplary embodiments, the latching mechanism can additionally or alternatively have a material spring, in particular a leaf spring. As a further addition or alternative, the spring, in particular the body spring or the material spring, need not or may not be, in particular be supported so as to be, movable, in particular rotationally, or need not or may not be non-movable or immovable or fixed and/or not connected firmly to the limiting element. In particular, the limiting element and the spring, in particular the body spring or the material spring, can have mutually corresponding latching contours, in particular in the form of at least one depression and at least one projection.

Furthermore, in the exemplary embodiment shown, the further operating element 12 is supported so as to be rotationally movable, in particular is moved or displaced, as shown in FIGS. 6 to 8, in the exemplary embodiment shown around the orthogonal direction r.

Figure 4:
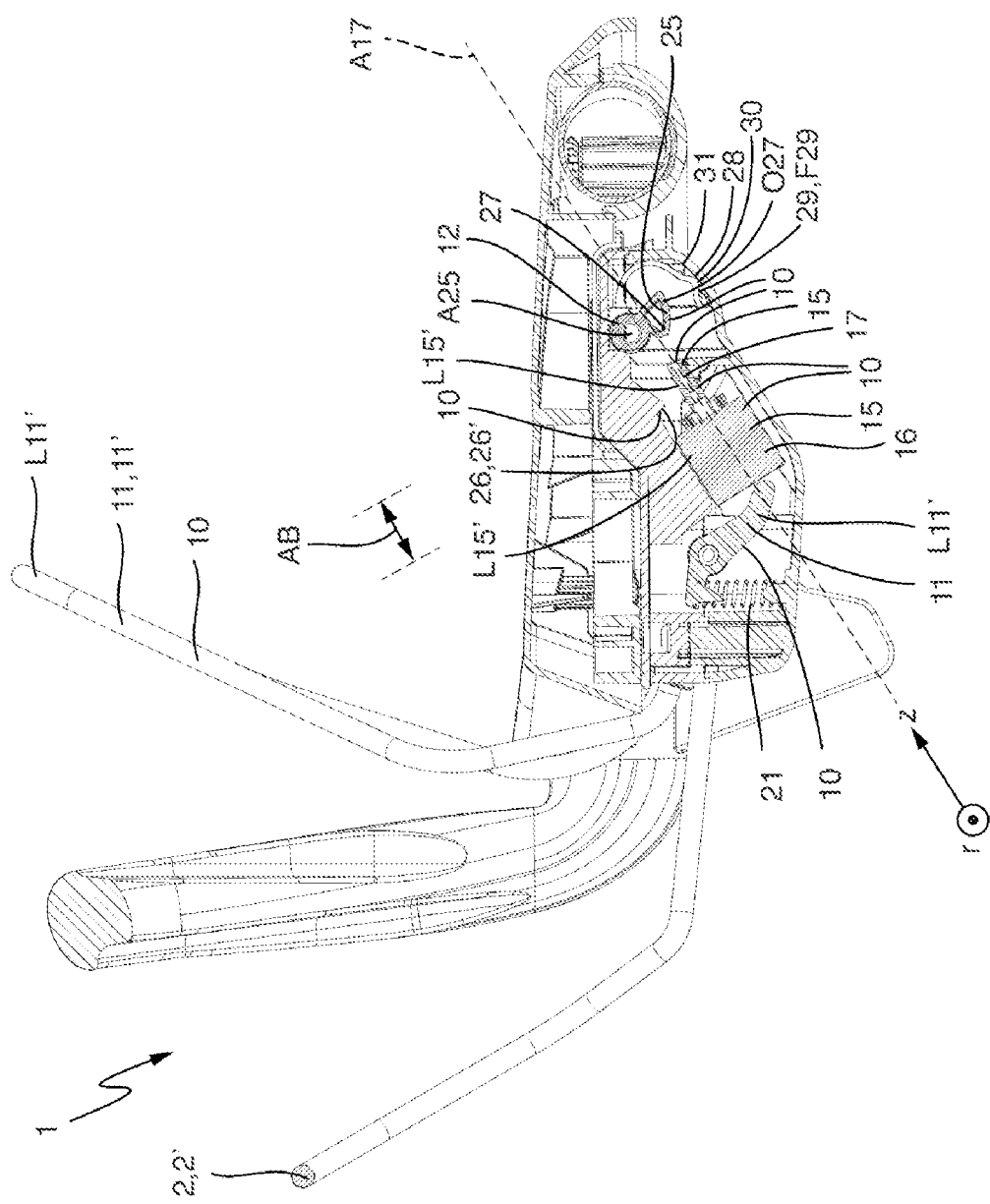
FIG. 4 shows a sectional view of the speed control device having an operating element, not operated, and a limiting element, not moved.

Moreover, the speed control device 10 has an operating return element 21, as shown in FIGS. 4 and 6 to 8. The operating return element 21 is designed to apply force, in particular applies force, in particular directly, to the operating element 11, in particular from an operating or respectively actuating position L11", as shown in FIGS. 5, 6 and 8, into an operating starting position L11', as shown in FIGS. 4 and 7.

Furthermore, the speed control device 10, in particular the travel sensor device 15, has a sensor return element 20, as shown in FIG. 10. The sensor return element 20 is designed to apply force, in particular applies force, in particular directly, to at least the sensor part 16, in particular and the further sensor part 17 away from one another, in particular from a translational displaced position L15", as shown in FIGS. 6 and 8, into a translational sensor starting position L15', as shown in FIGS. 4, 5 and 7.

In particular, the operating element 11 is designed, by its operation, by means of the sensor part 16 and the sensor return element 20, for the translational displacement of the further sensor part 17, in particular displaces said further sensor part.

Figure 13:
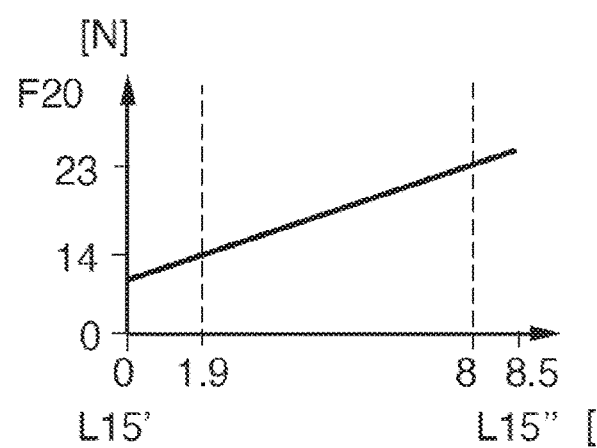
FIG. 13 shows a graph of a force of the sensor return element over a position of the sensor part and the further sensor part relative to one another.

In the exemplary embodiment shown, the sensor return element 20 and the, in particular resilient, latching mechanism 28, in particular the body spring 29, are dimensioned in such a way that, in a maximum displaced position 15" or with maximum, in particular maximum possible, displacement of the sensor part 16 and of the further sensor part 17 relative to one another, as shown in FIG. 8, a force F20, e.g. of 23 newtons (N), which is exerted by the further sensor part 17 on the limiting element 25, in particular the surface O27 of the eccentric link section 27, as shown in FIG. 13, is smaller than a force F29, e.g. of 25 N, which is to be exerted for adjusting the latching mechanism 28, in particular the body spring 29. This makes it possible to prevent unintentional adjustment of the limiting element 25.

Figure 11:
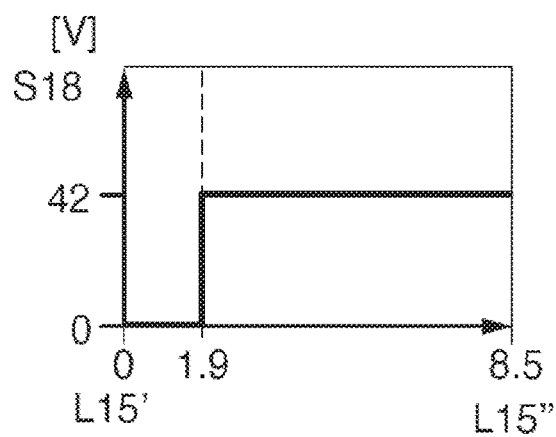
FIG. 11 shows a graph of a switching state of the switch over a position of the sensor part and the further sensor part relative to one another.

Moreover, the displacement sensor device 15 has a switch 18, as shown in FIG. 10. A switching state S18 of the switch 18 is dependent on the position L15', L15", in particular of the sensor part 16 and of the further sensor part 17 relative to one another, as shown in FIG. 11. The speed control device 10 is designed to enable and/or disable, in particular enables, as shown in FIGS. 6 and 8, and disables, as shown in FIGS. 4, 5 and 7, the travel drive system 5, in particular directly, in accordance with the switching state S18.

In detail, the speed control device 10 has EC electronics (not shown). The EC electronics are designed to output an enable signal to DC electronics (not shown) of the travel drive system 5 or to wake up the DC electronics in accordance with the switching state S18.

In FIG. 4, the operating element 11 is not operated or is in the operating starting position L11', in particular the hoop 11' is open. Thus, the sensor part 16 and the further sensor part 17 are not displaced relative to one another or are in the sensor starting position L15'. Thus, the switching state S18 is open or low, as shown in FIG. 11, and thus, the speed control device 10 disables the travel drive system 5. In addition, the sensor signal S15 is thus high, as shown in FIG. 12, and hence the speed control device 10 controls the travel drive system 5 to set the travel speed v1 to 0, as shown in FIG. 14.

In FIG. 5, the operating element 11 is admittedly maximally operated or in a maximum operating position L11", in particular the hoop 11' is closed, in particular limited by the further limiting element 26. However, the limiting element 25 has been moved or set, in particular by the further operating element 12, in particular for a maximum travel speed vmax"" equal to 0, as shown in FIG. 14, in such a way that this does not limit the displacement of the further sensor part 17, in particular by the operating element 11. Thus, the sensor part 16 and the further sensor part 17 are not displaced relative to one another or are in the sensor starting position L15'. Thus, the switching state S18 is low and hence the speed control device 10 disables the travel drive system 5. In addition, the sensor signal S15 is thus high, and hence the speed control device 10 controls the travel drive system 5 to set the travel speed v1 to 0.

In FIG. 6, the operating element 11 is maximally operated or in the maximum operating position L11". Furthermore, the limiting element 25 has been moved or set, in particular by the further operating element 12, in particular for a maximum travel speed vmax" equal to 3.25 kilometres per hour (km/h), as shown in FIG. 14 by the line with triangular nodes, in such a way that this limits the displacement of the further sensor part 17, in particular by the operating element 11. Thus, the sensor part 16 and the further sensor part 17 are displaced relative to one another or in the displacement position L15". Thus, the switching state S18 is closed or high, as shown in FIG. 11, and hence the speed control device 10 enables the travel drive system 5. In addition, the sensor signal S15 is thus low, as shown in FIG. 12, and hence the speed control device 10 controls the travel drive system 5 to set the travel speed v1 to 3.25 km/h, as shown in FIG. 14.

Upon operation of the operating element 11 from the operating starting position L11' into an operating position L11' between the operating starting position L11' and the maximum operating position L11", the limiting element 25 initially does not limit the displacement of the further sensor part 17. Thus, the sensor part 16 and the further sensor part 17 are not displaced relative to one another or are in the sensor starting position L15'. Thus, the switching state S18 is low and hence the speed control device 10 disables the travel drive system 5. In addition, the sensor signal S15 is thus high, and hence the speed control device 10 controls the travel drive system 5 to set the travel speed v1 to 0, as shown in FIG. 14.

With increasing operation of the operating element 11, the limiting element 25 limits the displacement of the further sensor part 17. Thus, the sensor part 16 and the further sensor part 17 are displaced relative to one another or in the displacement position L15". Thus, the switching state S18 is high, and hence the speed control device 10 enables the travel drive system 5. In addition, the sensor signal S15 is thus low and hence the speed control device 10 controls the travel drive system 5 to set the travel speed v1 to a value between 0, in particular 2, and 3.25 km/h, as shown in FIG. 14.

This makes it possible to set the travel speed v1 to a value less than the set maximum travel speed vmax", e.g. for cornering.

In FIG. 7, the limiting element 25 has admittedly been moved or set, in particular for a maximum travel speed vmax' equal to 4.5 km/h, as shown in FIG. 14 by the line with diamond-shaped nodes, in such a way that this limits the displacement of the further sensor part 17. However, the operating element 11 is not operated or is in the operating starting position L11'. Thus, the sensor part 16 and the further sensor part 17 are not displaced relative to one another or are in the sensor starting position L15'. Thus, the switching state S18 is low, and hence the speed control device 10 disables the travel drive system 5. In addition, the sensor signal S15 is thus high, and hence the speed control device 10 controls the travel drive system 5 to set the travel speed v1 to 0, as shown in FIG. 14.

In FIG. 8, the operating element 11 is maximally operated or in the maximum operating position L11". Furthermore, the limiting element 25 has been moved or set, in particular for the maximum travel speed vmax' equal to 4.5 km/h, in such a way that this limits the displacement of the further sensor part 17. Thus, the sensor part 16 and the further sensor part 17 are maximally displaced, in particular to the maximum possible extent, relative to one another or in the maximum displacement position L15". Thus, the switching state S18 is high, and hence the speed control device 10 enables the travel drive system 5. In addition, the sensor signal S15 is thus at the lowest level, and hence the speed control device 10 controls the travel drive system 5 to set the travel speed v1 to 4.5 km/h, as shown in FIG. 14.

Upon operation of the operating element 11 from the operating starting position L11' into an operating position L11' between the operating starting position L11' and the maximum operating position L11", the limiting element 25 already initially limits the displacement of the further sensor part 17. Thus, the sensor part 16 and the further sensor part 17 are displaced relative to one another or in the displacement position L15". Thus, the switching state S18 is high, and hence the speed control device 10 enables the travel drive system 5. In addition, the sensor signal S15 is thus low and hence the speed control device 10 controls the travel drive system 5 to set the travel speed v1 to a value between 0, in particular 2, and 4.5 km/h, as shown in FIG. 14.

This makes it possible to variably set the travel speed v1, in particular and the maximum travel speed vmax, in particular in each case, as shown in FIG. 14.

As the at least one exemplary embodiment shown and described above makes clear, the invention makes available an advantageous garden tool which has improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A garden tool, comprising:
 a controllable travel drive system, wherein the travel drive system is designed to propel the garden tool; and
 a speed control device, wherein the speed control device has a user-operable operating element and a displacement sensor device,
 wherein at least one sensor part of the displacement sensor device is supported so as to be movable in translation,
 wherein the operating element is designed by its operation to displace at least the sensor part in translation,
 wherein a sensor signal of the displacement sensor device is dependent on a translational position of at least the sensor part,
 wherein the speed control device is designed for controlling the travel drive system for variable setting of a travel speed of the garden tool in accordance with the sensor signal,
 wherein the sensor part and a further sensor part of the displacement sensor device are supported so as to be movable in translation relative to one another,
 wherein the sensor signal is dependent on the position of the sensor part and of the further sensor part relative to one another,
 wherein the speed control device has a limiting element,
 wherein the limiting element is designed to limit a translational displacement of the further sensor part upon operation of the operating element for translational displacement of the sensor part and of the further sensor part relative to one another,
 wherein the limiting element is supported so as to be movable,
 wherein the operating element is designed by its operation to displace the further sensor part in translation,
 wherein the speed control device has a further user-operable operating element, and
 wherein the further operating element is designed by its operation to move the limiting element for variably settable limitation of the displacement of the further sensor part.

2. The garden tool according to claim 1,
 wherein the displacement sensor device has a switch,
 wherein a switching state of the switch is dependent on the position, and
 wherein the speed control device is designed to enable and/or disable the travel drive system in accordance with the switching state.

3. The garden tool according to claim 1,
 wherein the displacement sensor device has a linear potentiometer, and
 wherein the sensor signal is a potentiometer signal of the linear potentiometer.

4. The garden tool according to claim 1,
 wherein the speed control device has a further limiting element, and
 wherein the further limiting element is designed to limit the operation of the operating element and/or the displacement of the sensor part in order to limit the displacement of the sensor part and of the further sensor part relative to one another.

5. The garden tool according to claim 4, wherein the limiting element has an eccentric link section for variably settable limitation of the displacement of the further sensor part and is supported so as to be rotationally movable.

6. The garden tool according to claim 5, wherein, when the displacement of the further sensor part is limited, its displacement axis and a surface of the eccentric link section extend approximately orthogonally to one another.

7. The garden tool according to claim 6, wherein the speed control device has a latching mechanism, and
wherein the latching mechanism is designed to latch the setting of the limiting element.

8. The garden tool according to claim 7, wherein the latching mechanism has a body spring.

9. The garden tool according to claim 8, wherein the further operating element is supported so as to be rotationally movable.

10. The garden tool according to claim 1, wherein the displacement sensor device has a sensor return element, and
wherein the sensor return element is designed to apply force to the sensor part and the further sensor part away from one another, into a translational sensor starting position.

11. The garden tool according to claim 1, wherein the operating element is supported so as to be movable,
wherein the speed control device has an operating return element, and
wherein the operating return element is designed to apply force to the operating element into an operating starting position.

12. The garden tool according to claim 1, wherein the operating element is supported so as to be rotationally movable.

13. The garden tool according to claim 1, wherein the limiting element has an eccentric link section for variably settable limitation of the displacement of the further sensor part and is supported so as to be rotationally movable.

14. The garden tool according to claim 1, wherein the speed control device has a latching mechanism, and
wherein the latching mechanism is designed to latch the setting of the limiting element.

15. The garden tool according to claim 1, wherein the further operating element is supported so as to be rotationally movable.

16. The garden tool according to claim 1, wherein the speed control device has a sensor return element, and
wherein the sensor return element is designed to apply force to at least the sensor part into a translational sensor starting position.

* * * * *